(12) United States Patent
Tijssen et al.

(10) Patent No.: US 10,025,452 B2
(45) Date of Patent: Jul. 17, 2018

(54) PHYSICS-BASED CELL LAYOUT REDESIGN

(71) Applicant: Adobe Systems Incorporated, San Jose, CA (US)

(72) Inventors: Remon Tijssen, Mill Valley, CA (US); Michael S. Cragg, Berkeley, CA (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 254 days.

(21) Appl. No.: 14/853,756

(22) Filed: Sep. 14, 2015

(65) Prior Publication Data
US 2017/0075505 A1 Mar. 16, 2017

(51) Int. Cl.
*G06F 3/0481* (2013.01)
*G06F 17/24* (2006.01)
*G06F 17/21* (2006.01)

(52) U.S. Cl.
CPC .......... *G06F 3/0481* (2013.01); *G06F 17/212* (2013.01); *G06F 17/246* (2013.01)

(58) Field of Classification Search
None
See application file for complete search history.

(56) References Cited

U.S. PATENT DOCUMENTS

| | | | | |
|---|---|---|---|---|
| 5,883,625 | A * | 3/1999 | Crawford | G06F 3/0481 715/788 |
| 7,003,732 | B1 * | 2/2006 | Zhaksilikov | G06F 17/5054 715/205 |
| 7,164,410 | B2 * | 1/2007 | Kupka | G06F 3/0231 345/156 |
| 7,403,211 | B2 * | 7/2008 | Sheasby | G06T 11/60 345/660 |
| 9,836,203 | B2 * | 12/2017 | Schultink | G06F 3/04847 |
| 2005/0068290 | A1 * | 3/2005 | Jaeger | G06F 3/04845 345/156 |
| 2006/0161863 | A1 * | 7/2006 | Gallo | G06F 9/4443 715/810 |
| 2007/0196033 | A1 * | 8/2007 | Russo | G06F 17/30253 382/305 |
| 2008/0218532 | A1 * | 9/2008 | Young | G06F 9/4443 345/660 |
| 2010/0031214 | A1 * | 2/2010 | Hou | G06F 17/5072 716/119 |
| 2010/0146440 | A1 * | 6/2010 | Seong | H04N 21/4312 715/810 |
| 2012/0113036 | A1 * | 5/2012 | Lee | G06F 3/0482 345/173 |

(Continued)

*Primary Examiner* — Phenuel Salomon
(74) *Attorney, Agent, or Firm* — Wolfe-SBMC

(57) ABSTRACT

In embodiments of physics-based cell layout redesign, a computing device displays a cell layout interface that includes cells in a cell grid, and the computing device implements a physics-based algorithm as a computer application that can receive a redesign input to manipulate a cell in the cell layout interface. The physics-based algorithm is implemented to then determine one or more of the cells that are proximate the manipulated cell based on edge relations between an edge of the manipulated cell and respective edges of the one or more cells. The physics-based algorithm can then reconfigure the one or more proximate cells based on the redesign input to the manipulated cell and the edge relations between the edges of the cells.

20 Claims, 7 Drawing Sheets

(56) References Cited

U.S. PATENT DOCUMENTS

| | | | |
|---|---|---|---|
| 2012/0185761 A1* | 7/2012 | Adepalli | G06F 3/04883 715/227 |
| 2013/0239049 A1* | 9/2013 | Perrodin | G06F 3/0481 715/800 |
| 2013/0328888 A1* | 12/2013 | Beaver | G06T 13/80 345/473 |
| 2014/0208213 A1* | 7/2014 | DeLuca | G06F 3/0481 715/730 |
| 2016/0026376 A1* | 1/2016 | Schultink | G06F 3/04847 715/731 |

* cited by examiner

PHYSICS-BASED CELL LAYOUT REDESIGN

BACKGROUND

Many device users have electronic and computing devices, such as desktop computers, laptop computers, mobile phones, tablet computers, multimedia devices, and other similar devices. These types of computing devices are utilized for many different computing applications, such as for word processing, spreadsheet applications, graphic design, publication development, and the like. Many of these different computing applications are either based on cells in a cell grid or cell table, or allow a user to create a cell grid or table, such as in a document, spreadsheet, or publication. However, manipulating grid-based layouts in the different computing applications can be difficult, resulting in a poor user experience.

For example, changing the size or position of a cell may not affect the other cells, and can create overlaps or other unintended results. This in turn often means the user has to make a series of adjustments to other cells to readjust the cell layout to achieve a desired result. Further, selecting one cell in a cell grid and changing its width or height often does not reflect the intention of the user. Typically, selecting one cell in the cell grid results in an entire row or column of cells being repositioned in a uniform cell grid. Additionally, attempting to increase the size of one cell, or a row or column of cells, may then increase the size of the entire cell grid or cell table. In the different computing applications that may allow a user to reposition or resize an individual cell in a cell grid, the grid spacing of the cells in the cell grid is not maintained.

SUMMARY

This Summary introduces features and concepts of physics-based cell layout redesign, which is further described below in the Detailed Description and/or shown in the Figures. This Summary should not be considered to describe essential features of the claimed subject matter, nor used to determine or limit the scope of the claimed subject matter.

Physics-based cell layout redesign is described. In embodiments, a computing device is implemented to redesign a cell layout of a cell grid based on physics properties by reconfiguring cells that are proximate a manipulated cell in the cell grid. The computing device displays a cell layout interface that includes the cells in the cell grid. The computing device implements a physics-based algorithm as a computer application that can receive a redesign input to manipulate a cell, or two or more of the cells together, in the cell layout interface. The physics-based algorithm can be implemented as a module, component, software application, etc. of a computer application that generates the cell layout interface. Many different types of computer applications utilize or implement cell-based features or functions that provide for creating and designing a cell grid or cell table in a document, spreadsheet, publication, and the like.

In embodiments, the physics-based algorithm is implemented to receive the redesign input to manipulate a cell (or more than one cell), such as to resize or move the manipulated cell in the cell grid. A redesign input can be received in the cell layout interface, such as to interact, create, delete, and/or re-dimension one or more of the cells in a graphic design. The physics-based algorithm can then determine other cells that are proximate the manipulated cell based on edge relations between an edge of the manipulated cell and respective edges of the other cells. The edge relations can be determined based on a percentage of common edge relations between the edge of the manipulated cell and the respective edges of the adjacent or proximate cells. Additionally, the physics-based algorithm can determine opposing forces applied to the edge of the manipulated cell and to the respective edges of the proximate cells that have an edge relation with the manipulated cell.

In embodiments, the physics-based algorithm can then reconfigure the proximate cells based on the redesign input to the manipulated cell, based on the edge relations between the edges of the cells, based on the percentage of common edge relations between the edges of the cells, based on opposing forces applied to the edges of the cells during the redesign input to the manipulated cell, based on a grid layout spacing of the cells in the cell grid, and/or based on the edge of a cell that overlaps the surface of another cell (e.g., as the first cell is moved or resized, the edge of the cell begins to overlap the surface of an adjacent or proximate cell in the direction that the first cell is moved or resized). The physics-based algorithm can reconfigure (e.g., resize and/or move) the proximate cells in the cell grid, as well as add a new cell (or cells) to the cell grid in the cell layout interface, or delete one of the proximate cells to maintain the grid layout spacing of the cells in the cell grid.

BRIEF DESCRIPTION OF THE DRAWINGS

Embodiments of physics-based cell layout redesign are described with reference to the following Figures. The same numbers may be used throughout to reference like features and components that are shown in the Figures.

DETAILED DESCRIPTION

Figure 1:
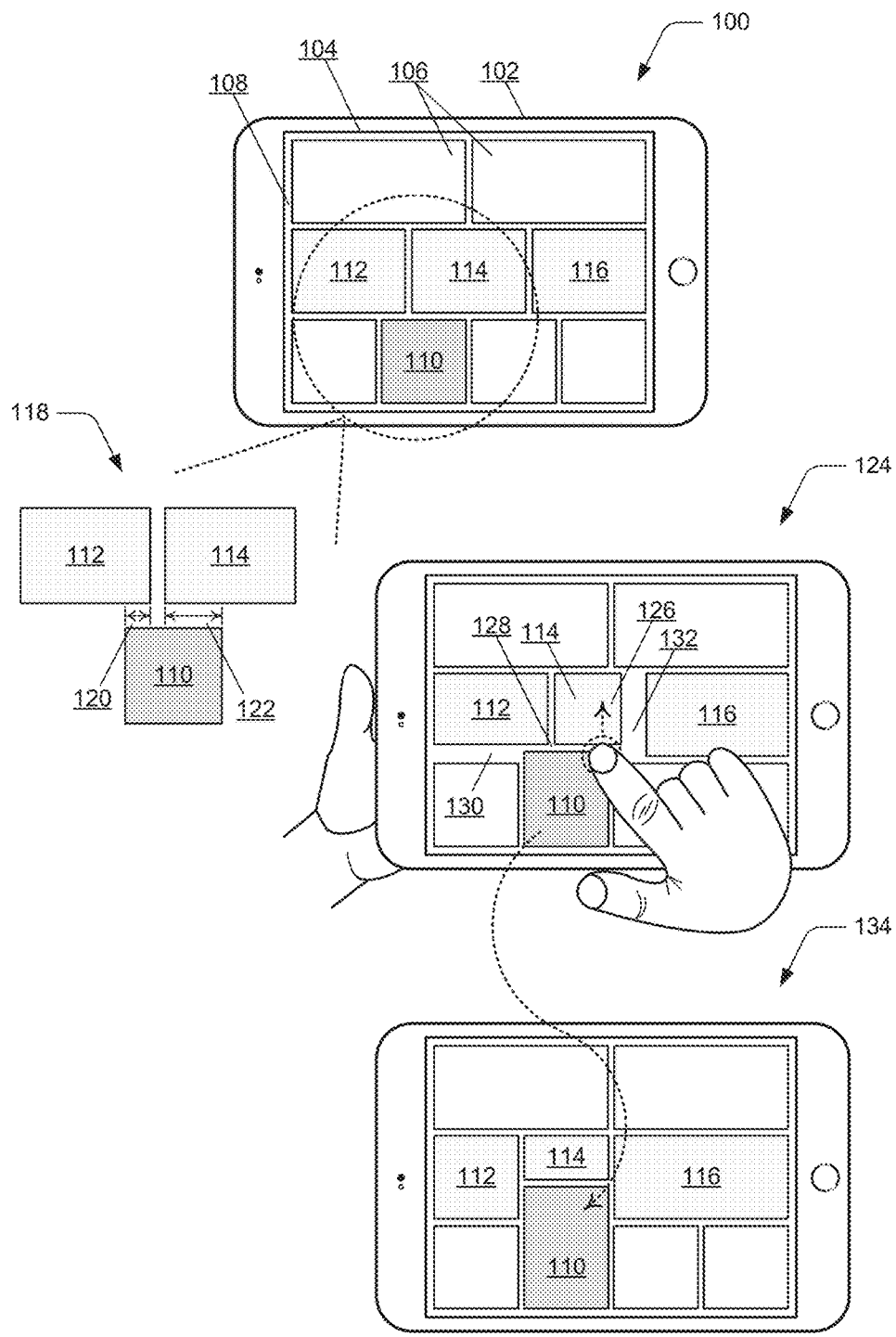
FIGS. 1-4 illustrate examples of physics-based cell layout redesign implemented with a mobile computing device in accordance with one or more embodiments as described herein.

Embodiments of physics-based cell layout redesign are described, and the techniques enable a user to manipulate (e.g., resize and/or move) a cell in a cell grid, while void spaces that are created when the cell is manipulated are filled-in and the grid layout space is maintained between the cells. Any type of computing device can be used to implement a physics-based algorithm that redesigns a cell layout of a cell grid based on physics properties by reconfiguring cells that are proximate a manipulated cell in the cell grid. The physics-based algorithm can be implemented as a module, component, software application, etc. of a computer application that generates a cell layout interface for display. Many different types of computer applications utilize or implement cell-based features or functions that provide for creating and designing a cell grid or cell table in a document, spreadsheet, publication, and the like.

A cell layout interface can be displayed and includes multiple cells in the cell grid. The physics-based algorithm can receive a user-initiated redesign input to manipulate a cell (or more than one cell), such as to resize or move the manipulated cell in the cell grid. A redesign input can be received in the cell layout interface, such as to interact, create, delete, and/or re-dimension one or more of the cells in a graphic design. The physics-based algorithm can then determine other cells that are proximate the manipulated cell based on edge relations between an edge of the manipulated cell and respective edges of the other cells. The edge relations can be determined based on a percentage of common edge relations between the edge of the manipulated cell and the respective edges of the proximate cells. Additionally, the physics-based algorithm can determine opposing forces applied to the edge of the manipulated cell and to the respective edges of the proximate cells that have an edge relation with the manipulated cell.

In embodiments, the physics-based algorithm can then reconfigure the proximate cells based on the redesign input to the manipulated cell, based on the edge relations between the edges of the cells, based on the percentage of common edge relations between the edges of the cells, based on opposing forces applied to the edges of the cells during the redesign input to the manipulated cell, based on a grid layout spacing of the cells in the cell grid, and/or based on the edge of a cell that overlaps the surface of another cell (e.g., as the first cell is moved or resized, the edge of the cell begins to overlap the surface of an adjacent or proximate cell in the direction that the first cell is moved or resized). The physics-based algorithm can then reconfigure (e.g., resize and/or move) the proximate cells in the cell grid, as well as add a new cell (or cells) to the cell grid in the cell layout interface, or delete one of the proximate cells to maintain the grid layout spacing of the cells in the cell grid.

The features of physics-based cell layout redesign provide that a user can easily edit a cell in a cell grid or a cell table without having to correct or modify each of the other cells that may be affected when manipulating the width and/or height of a single cell. The interaction system is based on real-world physics and will generally react as a user expects when editing the width and/or height of a single cell, providing a dynamic, fluid result when reconfiguring the cells in a cell grid, rather than overlapping the cells or increasing the overall size of the cell grid.

While features and concepts of physics-based cell layout redesign can be implemented in any number of different devices, systems, networks, environments, and/or configurations, embodiments of physics-based cell layout redesign are described in the context of the following example devices, systems, and methods.

FIG. 1 illustrates an example 100 of physics-based cell layout redesign, implemented with a mobile device, such as a tablet device 102 shown in this example or a mobile phone. As detailed in the system description shown in FIG. 5, the tablet device 102 can display a cell layout interface 104 of a computer application that is implemented by a computing device. For example, many different types of computer applications utilize or implement cell-based features or functions that provide for creating and designing a cell grid or cell table in a document, spreadsheet, publication, and the like. The different types of computer applications include word processing applications that allow insertion of a cell grid or table, spreadsheet applications that provide a cell grid, and graphic design applications that are commonly used for many types of magazine and other publication layouts, artistic uses, commercial and private uses, etc.

In this example, the cell layout interface 104 displays multiple cells 106 of various dimensions and in various configurations in a cell grid 108. Although the examples described herein are illustrated in the figures as a graphic design layout that has cells of different sizes, the described techniques of physics-based cell layout redesign can be applied to cells of different shapes and sizes, as well as uniform grid layouts, such as for cell grids in spreadsheets and cell tables in word processing documents. Further, some of the cells in the examples of cell layout interfaces described herein are shown having different variations of shading merely to facilitate the discussion and to illustrate the cells that are being manipulated by user input, and the cells that are proximate a manipulated cell which are then reconfigured to redesign the cell layout. For example, a user may initiate a redesign input, such as with a touch selection or with other types computer inputs, to manipulate a cell 110, which then affects some of the cells 112, 114, and 116 that are proximate the manipulated cell.

As described herein, a cell that is being manipulated (e.g., moved or resized), such as the cell 110, has edge relations with other cells in the cell grid 108 that are proximate the manipulated cell, such as the cells 112 and 114 that are proximate the cell 110. For example, as shown in the expanded illustration 118, the proximate cell 112 has an approximately 25% common edge relation 120 with the manipulated cell 110, and the proximate cell 114 has an approximately 75% common edge relation 122 with the manipulated cell 110. In other scenarios, the edge of the manipulated cell 110 may begin to overlap the respective surfaces of the proximate cells 112 and 114 as the manipulated cell 110 is moved or resized, as shown at 124. For example, the edge of the manipulated cell 110 begins to overlap the surfaces of the proximate cells 112 and 114 in the direction of a redesign input 126 that the manipulated cell is moved or resized.

As shown at 124, a user can touch-select the cell 110 in the cell layout interface 104 to initiate the redesign input 126 of the cell 110, and to redesign the overall cell layout of the cells 106 in the cell layout interface 104. In this example, the manipulated cell 110 is expanded upward, which pushes into the space occupied by the proximate cells 112 and 114 that are directly above the manipulated cell 110. As shown at 128, the proximate cells 112 and 114 contract in size (e.g., contract upward) to accommodate the expanding manipulated cell 110 and to maintain the cell grid spacing, as well as creating a void space 130 below the cell 112. In addition to the proximate cell 114 contracting upward, the manipulated cell 110 expanding upward causes the proximate cell 114 to contract left from the right edge of the cell. In some scenarios, this may also create a void space 132 between the cells 114 and 116. However, in this example, the void space 132 is shown merely for discussion to illustrate that as a void space develops, it can fill-in in real-time as the cell 110 is being manipulated. In practice, the void space 132 would not develop in the cell grid (or not develop to the extent shown at 124) because the void space would be filled-in by the cell 116 expanding to the left to fill-in the void space (e.g., as shown at 134).

As shown further at 134 when the manipulated cell 110 has been resized, the cell 112 contracts left to align with the width of the cell below it and also expands down to fill in the void space 130 in the cell grid. The cell 114 further contracts in size to accommodate the expansion of the manipulated cell 110, and also aligns with the width of the manipulated cell 110. The cell 116 further expands left to fill in the void space 132 in the cell grid (as described above, in real-time), aligning with the width of the cell above it.

Figure 5:
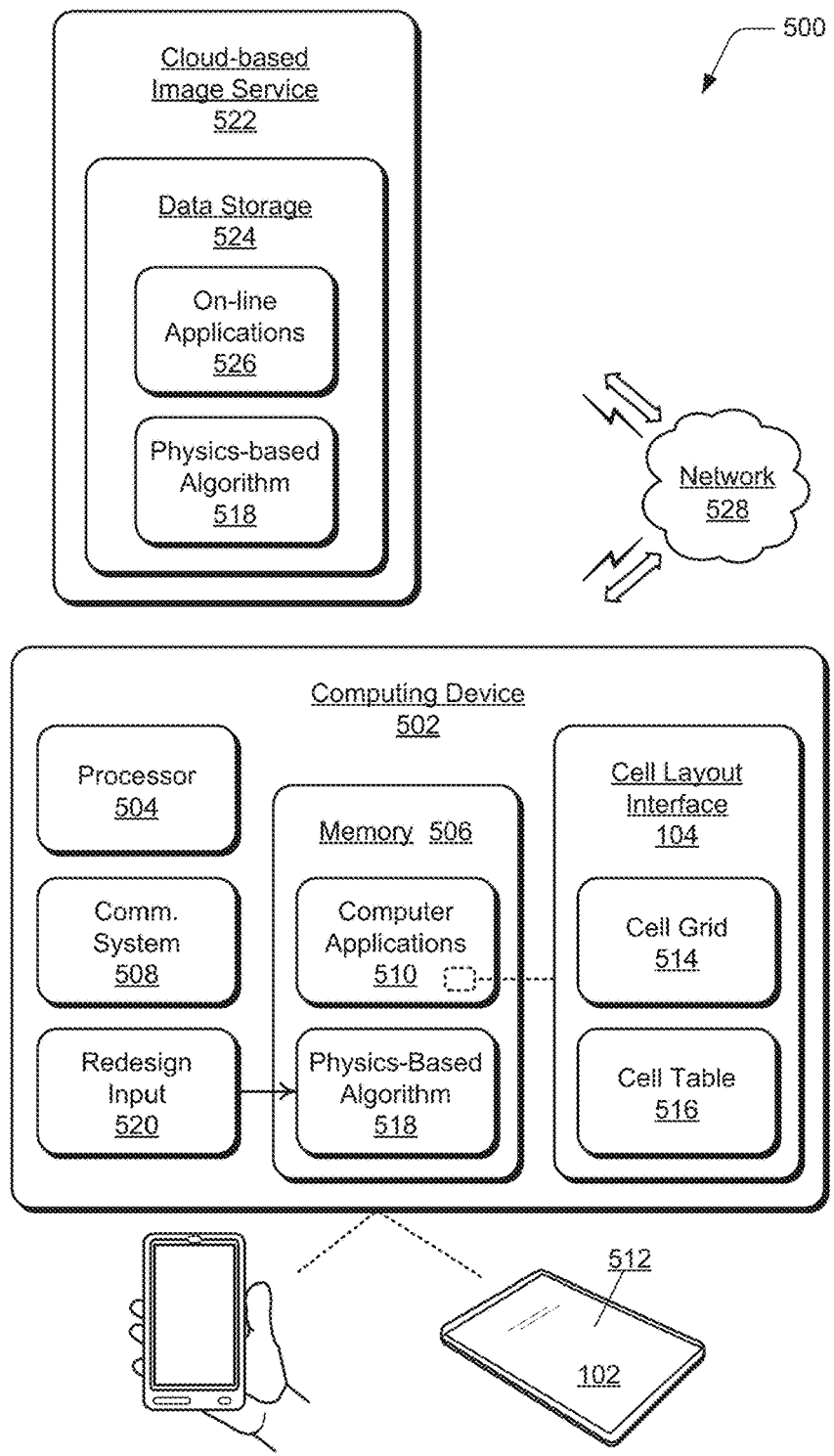
FIG. 5 illustrates an example system in which embodiments of physics-based cell layout redesign can be implemented.

In embodiments, and as further detailed in the system description shown in FIG. 5, the mobile device implements a physics-based algorithm (e.g., as a module, a component, a software application, etc.) of the computer application that generates the cell layout interface 104. The physics-based algorithm is designed to respond to the redesign input 126 of the manipulated cell 110, and determine which of the other cells in the cell layout interface 104 to reconfigure (e.g., reposition and/or resize) for the cell layout redesign. In the described techniques, any cell 106 in the cell grid 108 may have an edge relation with one or more of the other cells in the cell grid. For example, as shown at 100, the top edge of the cell 110 has a common edge relation with part of the bottom edge of both of the proximate cells 112 and 114 that are above the cell 110.

In the illustrated example, the edges of the cells in the cell grid 108 are not in contact or touching, but in other implementations, the edges of the cells in a cell grid or table may be in contact or touching, or an edge may be common to more than cell (e.g., shared by two cells). In either instance, the edge of one cell may have any type of edge relation or edge zone with another cell in a cell grid, where the edges of the cells fully overlap, partially overlap, are touching, are in contact, or have a buffer or space between the cells. As shown, the proximate cells 112 and 114 each have an edge that partially overlaps (in the horizontal direction) the edge of the cell 110, where the cell 114 has a larger percentage of overlap with cell 110 than does the other cell 112.

In embodiments, the physics-based algorithm is implemented to receive a redesign input to one or more cells in a cell grid that is being manipulated, such as to resize and/or reposition the cell or cells, and then the physics-based algorithm determines any of the other cells (e.g., adjacent or proximate cells) in the cell grid that have an edge relation with a manipulated cell. For example, the physics-based algorithm receives the redesign input 126 of the manipulated cell 110, and determines which of the other cells 106 in the cell grid 108 have an edge relation with the manipulated cell, such as a common edge relation or a percentage of a common edge relation. The physics-based algorithm can determine that the proximate cells 112 and 114 each have a common edge relation of a bottom edge that is partially common to the top edge of the manipulated cell 110 (e.g., as described above with reference to the expanded illustration 118).

The physics-based algorithm can then reconfigure (e.g., reposition and/or resize) the proximate cells 112 and 114 in the cell grid for a cell layout redesign based on the repositioning and/or resizing of the manipulated cell 110. The physics-based algorithm determines how to affect the cell layout when one or more cells in the cell grid are manipulated to change their width and/or height. The physics-based algorithm also maintains the overall size and shape of the cell grid when changing the size and/or position of other cells. For example, the redesign input 126 to the cell 110 causes an upward force that is applied by the manipulated cell 110 to the bottom edges of the proximate cells 112 and 114. In an opposite reaction, the physics-based algorithm contracts the size of the proximate cells 112 and 114 upward to accommodate the expanding size of the manipulated cell 110.

Further, the edge relation of the proximate cell 114 has a larger percentage of common horizontal overlap with the manipulated cell 110 than does the edge relation of the other proximate cell 112. The physics-based algorithm is designed to determine the percentage of proximate cells common edge relations to the manipulated cell, which is then utilized as a basis to determine the force applied to reconfigure and/or resize each of the proximate cells. The opposite dimension of a cell can be expanded or contracted based on the percentage amount of common edge relation with another cell. If the common edge relation between two cells is more than 50% of the cells' width or height, then the opposite dimension is diminished, such as to contract the size of a proximate cell. Alternatively, if the common edge relation between two cells is less than 50% of the cells' width or height, then the opposite dimension is expanded, such as to expand the size of a proximate cell. When reconfiguring and/or resizing, the cells can be manipulated by the physics-based algorithm to have a dynamic, fluid reaction to fill in the void spaces in the cell grid and maintain the grid layout spacing between the cells.

Figure 2:
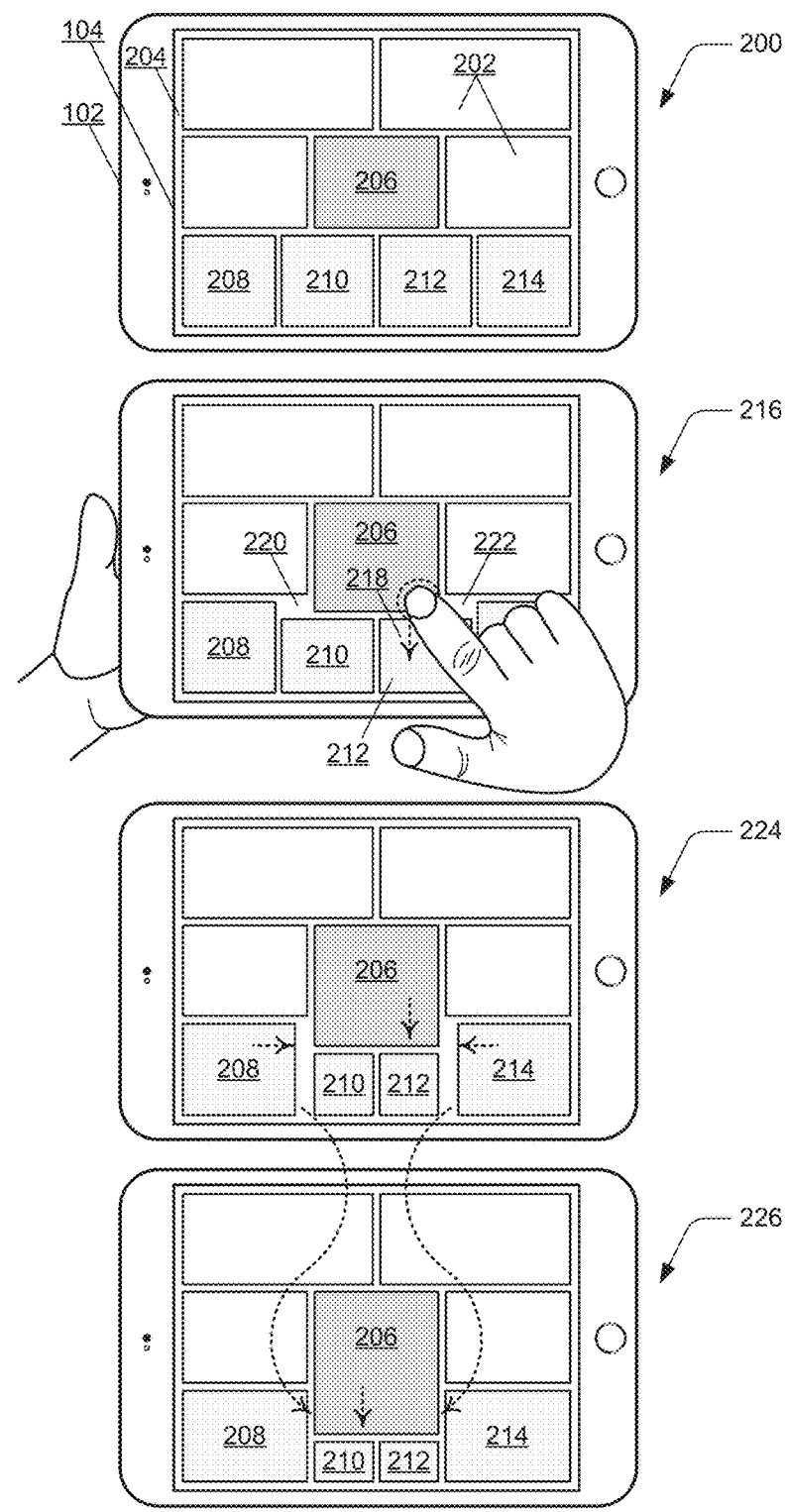

FIG. 2 illustrates another example 200 of physics-based cell layout redesign. As shown and described with reference to FIG. 1, the cell layout interface 104 is shown displayed on the tablet device 102, and the cell layout interface 104 displays multiple cells 202 of various dimensions and in various configurations in a cell grid 204. In this example, a user may initiate a redesign input, such as with a touch selection or with other types computer inputs, to manipulate a cell 206, which then affects some of the cells 208, 210, 212, and 214 that are proximate the manipulated cell. As shown at 216, a user can touch-select the cell 206 in the cell layout interface 104 to initiate a redesign input 218 of the cell 206, and to redesign the overall cell layout of the cells 202 in the cell layout interface 104.

In this example, the manipulated cell 206 is expanded downward, which pushes into the space occupied by the cells 210 and 212 that are directly below the manipulated cell 206. The proximate cells 210 and 212 contract in size (e.g., contract downward) to accommodate the expanding manipulated cell 206 and to maintain the cell grid spacing, as well as creating a void space 220 above the cell 210 and a void space 222 above the cell 212. In addition to the proximate cell 210 contracting downward, the manipulated cell 206 expanding downward causes the proximate cell 210 to contract right from the left edge of the cell to align with the manipulated cell 206. In approximately real-time, the cell 208 expands right as shown at 224 to fill in space in the cell grid between the cells 210 and 208, aligning with the width of the cell above it as shown at 226.

Similarly, in addition to the proximate cell 212 contracting downward, the manipulated cell 206 expanding downward causes the proximate cell 212 to contract left from the right edge of the cell to align with the manipulated cell 206. In approximately real-time, the cell 214 expands left as shown at 224 to fill in space in the cell grid between the cells 212 and 214, aligning with the width of the cell above it as shown at 226. It should be noted in this example that the cells 208 and 214 in the cell grid 204 that are not in direct contact with the manipulated cell 206 can optionally be adjusted to eliminate void space that may be created when the manipulated cell 206 is moved or resized, affecting other cells that are in direct contact with the manipulated cell, such as the proximate cells 210 and 212. In embodiments, the physics-based algorithm can be implemented with an edit mode that allows a user to control the reconfiguration of a cell grid, such as by user selection to ignore or lock some of the proximate cells so that they maintain their shape and position, while other cells in the cell grid are affected by the forces applied by the manipulated cell.

As shown in the illustrated example at 216, the proximate cells 210 and 212 each have an edge relation with the cell 206, where the respective edges of the proximate cells 210 and 212 are partially common (e.g., horizontally overlap) with the edge of the cell 206, and the proximate cells 210 and 212 have approximately the same percentage of common edge relation with the manipulated cell 206. The physics-based algorithm receives the redesign input 218 of the manipulated cell 206, and determines which of the other cells 202 in the cell grid 204 have an edge relation with the manipulated cell. The physics-based algorithm can determine that the proximate cells 210 and 212 each have an edge relation of a top edge that is partially common with the bottom edge of the manipulated cell 206. The physics-based algorithm can then reconfigure (e.g., reposition and/or resize) the proximate cells 210 and 212, as well as the cells 208 and 214, in the cell grid for a cell layout redesign based on the repositioning and/or resizing of the manipulated cell 206. For example, the redesign input 218 to the cell 206 causes a downward force that is applied by the manipulated cell 206 to the top edges of the proximate cells 210 and 212. In an opposite reaction, the physics-based algorithm contracts the size of the proximate cells 210 and 212 downward evenly to accommodate the expanding size of the manipulated cell 206.

Figure 3:
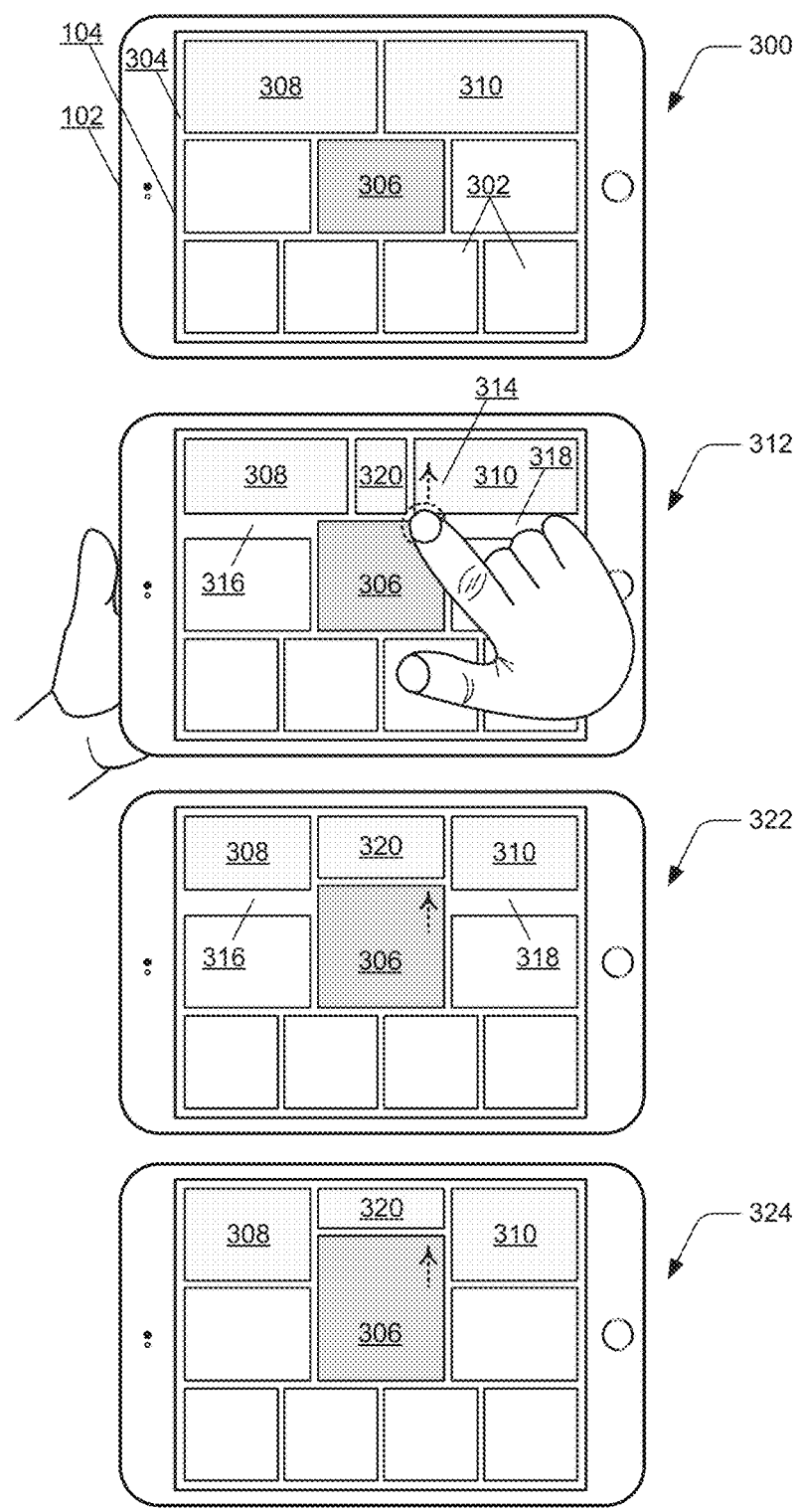

FIG. 3 illustrates another example 300 of physics-based cell layout redesign. As shown and described with reference to FIGS. 1 and 2, the cell layout interface 104 is shown displayed on the tablet device 102, and the cell layout interface 104 displays multiple cells 302 of various dimensions and in various configurations in a cell grid 304. In this example, a user may initiate a redesign input, such as with a touch selection or with other types computer inputs, to manipulate a cell 306, which then affects some of the cells 308 and 310 that are proximate the manipulated cell. As shown at 312, a user can touch-select the cell 306 in the cell layout interface 104 to initiate a redesign input 314 of the cell 306, and to redesign the overall cell layout of the cells 302 in the cell layout interface 104.

In this example, the manipulated cell 306 is expanded upward, which pushes into the space occupied by the cells 308 and 310 that are directly above the manipulated cell 306. Initially the proximate cells 308 and 310 contract in size (e.g., contract upward) to accommodate the expanding manipulated cell 306 and to maintain the cell grid spacing, as well as creating a void space 316 below the cell 308 and a void space 318 below the cell 310. In addition to the proximate cells 308 and 310 contracting upward, the manipulated cell 306 expanding upward causes the proximate cell 308 to contract left from the right edge of the cell and the proximate cell 310 to contract right from the left edge of the cell. This also develops a space between the cells 308 and 310 for a new cell 320 that is created, as shown at 312 and 322. As shown at 324 when the manipulated cell 306 has been resized, the cell 308 expands down to fill in the void space 316 in the cell grid, aligning with the width of the cell below it. Similarly, the cell 310 expands down to fill in the void space 318 in the cell grid, aligning with the width of the cell below it.

As shown in the illustrated example at 300 and 312, the proximate cells 308 and 310 each have an edge relation with the cell 306, where the respective edges of the proximate cells 308 and 310 are partially common (e.g., horizontally overlap) with the edge of the cell 306, and the proximate cells 308 and 310 have approximately the same percentage of common edge relation with the manipulated cell 306. The physics-based algorithm receives the redesign input 314 of the manipulated cell 306, and determines which of the other cells 302 in the cell grid 304 have an edge relation with the manipulated cell. The physics-based algorithm can determine that the proximate cells 308 and 310 each have an edge relation of a bottom edge that is partially common with the top edge of the manipulated cell 306.

The physics-based algorithm can then reconfigure (e.g., reposition and/or resize) the proximate cells 308 and 310, as well as add the new cell 320, in the cell grid for a cell layout redesign based on the repositioning and/or resizing of the manipulated cell 306. For example, the redesign input 314 to the cell 306 causes an upward force that is applied by the manipulated cell 306 to the bottom edges of the proximate cells 308 and 310. In an opposite reaction, the physics-based algorithm contracts the size of the proximate cells 308 and 310 upward and horizontally to accommodate the expanding size of the manipulated cell 306 and the newly created cell 320. In embodiments, the physics-based algorithm can be implemented with an edit mode that allows a user to control the reconfiguration of a cell grid, such as by user selection to ignore or lock some of the proximate cells so that they maintain their shape and position, while other cells in the cell grid are affected by the forces applied by the manipulated cell.

Figure 4:
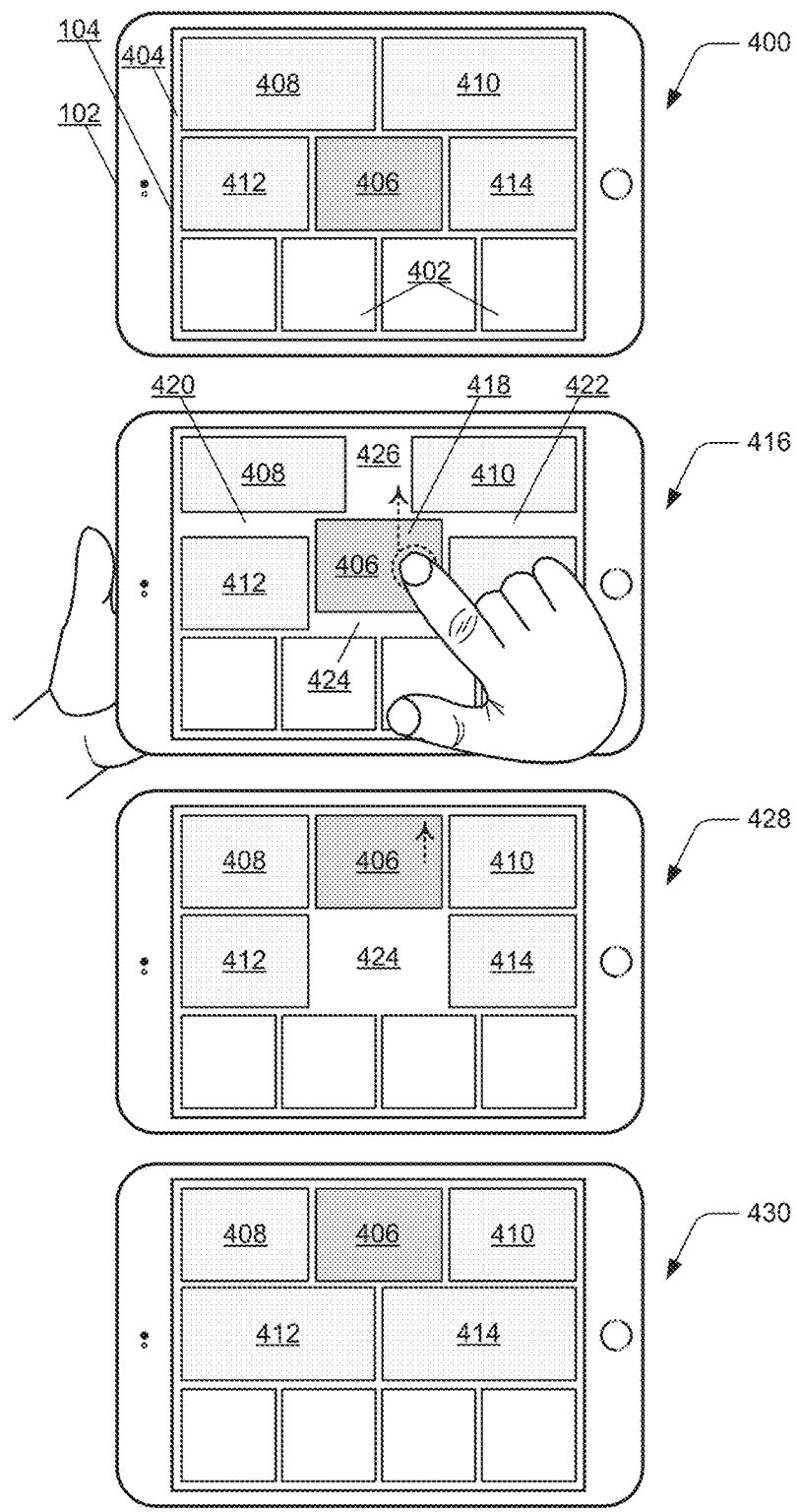

FIG. 4 illustrates another example 400 of physics-based cell layout redesign, in which a manipulated cell is repositioned rather than resized as shown and described with reference to FIGS. 1-3. In this example, the cell layout interface 104 is shown displayed on the tablet device 102, and the cell layout interface 104 displays multiple cells 402 of various dimensions and in various configurations in a cell grid 404. A user may initiate a redesign input, such as with a touch selection or with other types computer inputs, to manipulate a cell 406, which then affects some of the cells 408, 410, 412, and 414 that are proximate the manipulated cell. As shown at 416, a user can touch-select the cell 406 in the cell layout interface 104 to initiate a redesign input 418 of the cell 406 (e.g., to move the cell in the cell grid), and to redesign the overall cell layout of the cells 402 in the cell layout interface 104.

In this example, the manipulated cell 406 is moved upward, which pushes into the space occupied by the cells 408 and 410 that are directly above the manipulated cell 406. The proximate cells 408 and 410 contract in size (e.g., contract upward) to accommodate repositioning the manipulated cell 406, and several void spaces are created around the manipulated cell 406. For example, a void space 420 is created below the cell 408, a void space 422 is created below the cell 410, and a void space 424 is created below the manipulated cell 406. In addition to the proximate cells 408 and 410 contracting upward, the manipulated cell 406 moving upward causes the proximate cell 408 to contract left from the right edge of the cell and the proximate cell 410 to contract right from the left edge of the cell. This also develops a void space 426 between the cells 408 and 410.

As shown at 428 when the manipulated cell 406 is moved up into position, the proximate cell 408 further contracts left and expands down to fill in the void space 424 in the cell grid, aligning with the width of the cell below it. Similarly, the proximate cell 410 further contracts right and expands down to fill in the void space 422 in the cell grid, aligning with the width of the cell below it. Further, as shown at 430, the proximate cell 412 expands right and the proximate cell 414 expands left to fill in the void space 424 in the cell grid. The cell layout redesign and reconfiguration of the cells in the cell grid 404 happen in approximately real-time, in dynamic, fluid motion to fill in the void spaces in the cell grid and maintain the grid layout spacing between the cells.

As shown in the illustrated example at 400 and 416, the proximate cells 408 and 410 each have an edge relation with the cell 406, where the respective edges of the proximate cells 408 and 410 are partially common (e.g., horizontally overlap) with the edge of the cell 406, and the proximate cells 408 and 410 have approximately the same percentage of common edge relation with the manipulated cell 406. The physics-based algorithm receives the redesign input 418 of the manipulated cell 406, and determines which of the other cells 402 in the cell grid 404 have an edge relation with the manipulated cell. The physics-based algorithm can determine that the proximate cells 408 and 410 each have an edge relation of a bottom edge that is partially common with the top edge of the manipulated cell 406. The physics-based algorithm can then reconfigure (e.g., reposition and/or resize) the proximate cells 408 and 410, as well as resize the proximate cells 412 and 414, in the cell grid for a cell layout redesign based on the repositioning of the manipulated cell 406. For example, the redesign input 418 to the cell 406 causes an upward force that is applied by the manipulated cell 406 to the bottom edges of the proximate cells 408 and 410. In an opposite reaction, the physics-based algorithm contracts the size of the proximate cells 408 and 410 upward and horizontally to accommodate repositioning the manipulated cell 406, and expands the size of the proximate cells 412 and 414.

FIG. 5 illustrates an example system 500 in which embodiments of physics-based cell layout redesign can be implemented. The example system 500 includes a computing device 502, such as the tablet device 102 shown in FIGS. 1-4, or any other type of a mobile phone, media playback, computing, communication, gaming, entertainment, portable electronic media device, or computer device. The computing device 502 can be implemented with various components, such as a processor 504 (or processing system) and memory 506, and with any number and combination of differing components as further described with reference to the example device shown in FIG. 7. Although not shown, the computing device 502 can include a power source, such as a battery, to power the various device components. Further, the computing device 502 can include different wireless radio systems, such as for Wi-Fi, Bluetooth™, Mobile Broadband, LTE, or any other wireless communication system or format. Generally, the computing device 502 implements a communication system 508 that includes a radio device, antenna, and chipset that is implemented for wireless communication with other devices, networks, and services.

The computing device 502 includes one or more computer applications 510 that generate the cell layout interface 104 for display on a display device 512 of the computing device, as referred to above. The computer applications 510 can include many different types of computer applications that utilize or implement cell-based features or functions that provide for creating and designing a cell grid 514 or cell table 516 in a document, spreadsheet, publication, and the like. The different types of computer applications 510 include word processing applications that allow insertion of a cell grid or table, spreadsheet applications that provide a cell grid, and graphic design applications that are commonly used for many types of magazine and other publication layouts, artistic uses, commercial and private uses, etc.

Any of the different types of computer applications can include the physics-based algorithm 518 that implements embodiments of physics-based cell layout redesign, as illustrated and described above with reference to FIGS. 1-4. The physics-based algorithm 518 can be implemented as a software application or module, such as computer-executable software instructions that are executable with the processor 504 (or with a processing system) to implement embodiments described herein. The physics-based algorithm 518 can be stored on computer-readable storage memory (e.g., the device memory 506), such as any suitable memory device or electronic data storage implemented in the computing device. Although shown as a separate module or component in memory 506, the physics-based algorithm 518 may be integrated as a module or component with any of the computer applications 510 for cell layout redesign of a cell grid 514 or cell table 516 in the cell layout interface 104.

The physics-based algorithm 518 is implemented to receive a redesign input 520 to manipulate (e.g., resize and/or move) one or more cells in a cell grid 514 or cell table 516 in the cell layout interface 104. A redesign input can be received in the cell layout interface, such as to interact, create, delete, and/or re-dimension one or more of the cells in a graphic design. The physics-based algorithm 518 can then determine other cells that are proximate the manipulated cell based on edge relations between an edge of the manipulated cell and respective edges of the other cells. The edge relations can be determined based on a percentage of common edge relations between the edge of the manipulated cell and the respective edges of the adjacent or proximate cells. Additionally, the physics-based algorithm 518 can determine opposing forces applied to the edge of the manipulated cell and to the respective edges of the proximate cells that have an edge relation with the manipulated cell.

In embodiments, the physics-based algorithm 518 can then reconfigure the proximate cells based on the redesign input 520 to the manipulated cell, based on the edge relations between the edges of the cells, based on the percentage of common edge relations between the edges of the cells, based on opposing forces applied to the edges of the cells during the redesign input to the manipulated cell, based on a grid layout spacing of the cells in the cell grid, and/or based on the edge of a cell that overlaps the surface of another cell (e.g., as the first cell is moved or resized, the edge of the cell begins to overlap the surface of an adjacent or proximate cell in the direction that the first cell is moved or resized). The physics-based algorithm 518 can reconfigure (e.g., resize and/or move) the proximate cells in the cell grid, as well as add a new cell (or cells) to the cell grid in the cell layout interface, or delete one of the proximate cells to maintain the grid layout spacing of the cells in the cell grid.

The example system 500 can also include a cloud-based image service 522, such as Adobe Creative Cloud™ that is accessible by client devices, to include the computing device 502 and the tablet device 102. The image service 522 includes data storage 524 that may be implemented as any suitable memory, memory device, or electronic data storage for network-based data storage. The data storage can maintain an instance of the physics-based algorithm 518, as well as on-line applications 526 (e.g., as network-based applications), that are accessible by a computer application 510 from the computing device 502.

The cloud-based image service 522 can also be implemented with server devices that are representative of one or multiple hardware server devices of the image service. Further, the cloud-based image service 522 can be implemented with various components, such as a processing system and memory, as well as with any number and combination of differing components as further described with reference to the example device shown in FIG. 7 to implement the services, applications, servers, and other features of physics-based cell layout redesign.

The example system 500 also includes a network 528, and any of the devices, servers, and/or services described herein can communicate via the network, such as for data communication between the computing device 502 and the cloud-based image service 522. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

Example method 600 is described with reference to FIG. 6 in accordance with one or more embodiments of physics-based cell layout redesign. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
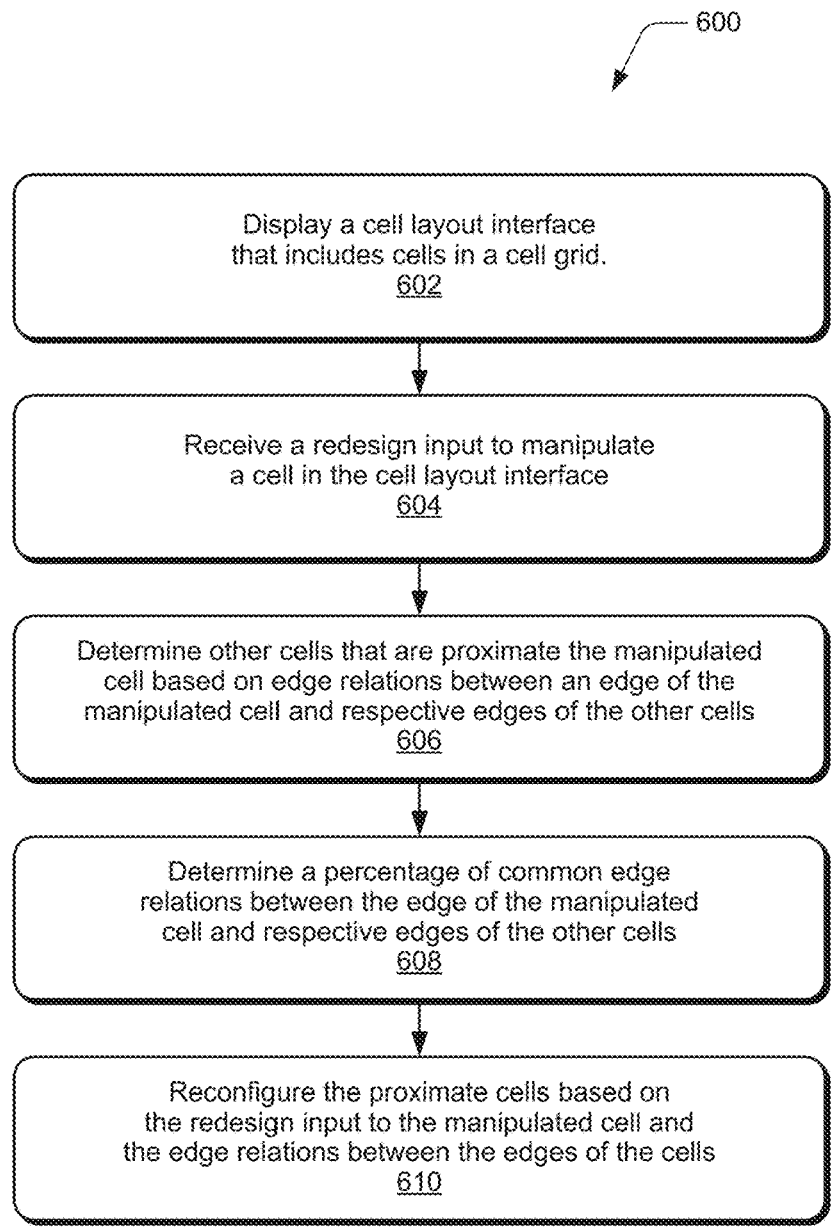
FIG. 6 illustrates example methods of physics-based cell layout redesign in accordance with one or more embodiments of the techniques described herein.

FIG. 6 illustrates example method(s) 600 of physics-based cell layout redesign, and is generally described with reference to the physics-based algorithm implemented by the computing device as shown in the example system of FIG. 5. The order in which the method is described is not intended to be construed as a limitation, and any number or combination of the method operations can be combined in any order to implement a method, or an alternate method.

At 602, a cell layout interface is displayed that includes cells in a cell grid. For example, the tablet device 102 (shown in FIGS. 1-4) is a computing device that displays the cell layout interface 104 of a computer application that is implemented by the computing device. The cell layout interface 104 displays multiple cells of various dimensions and in various configurations in a cell grid.

At 604, a redesign input is received to manipulate a cell in the cell layout interface. For example, the physics-based algorithm 518 receives the redesign input 520 to manipulate a cell (or more than one cell) in the cell layout interface 104, such as to resize and/or move the manipulated cell in the cell grid. Alternatively, the redesign input 520 can be received to manipulate two or more cells in the cell layout interface 104. A redesign input can be received in the cell layout interface 104, such as to interact, create, delete, and/or re-dimension one or more of the cells in a graphic design.

At 606, other cells are determined that are proximate the manipulated cell based on edge relations between an edge of the manipulated cell and respective edges of the other cells. For example, the physics-based algorithm 518 determines other cells that are adjacent or proximate the manipulated cell based on edge relations between an edge of the manipulated cell and respective edges of the other cells. Additionally, the physics-based algorithm can determine opposing forces applied to the edge of the manipulated cell and to the respective edges of the proximate cells that have an edge relation with the manipulated cell.

At 608, a percentage of common edge relations between the edge of the manipulated cell and respective edges of the other cells is determined. For example, the physics-based algorithm 518 determines a percentage of common edge relations between the edge of the manipulated cell and respective edges of the other cells.

At 610, the proximate cells are reconfigured based on the redesign input to the manipulated cell and the edge relations between the edges of the cells. For example, the physics-based algorithm 518 that is implemented by the computing device 502 reconfigures the proximate cells (e.g., adjacent or proximate the manipulated cell) based on the redesign input 520 to the manipulated cell, based on the edge relations between the edges of the cells, based on the percentage of common edge relations between the edges of the cells, based on opposing forces applied to the edges of the cells during the redesign input to the manipulated cell, based on a grid layout spacing of the cells in the cell grid, and/or based on the edge of a cell that overlaps the surface of another cell (e.g., as the first cell is moved or resized, the edge of the cell begins to overlap the surface of an adjacent or proximate cell in the direction that the first cell is moved or resized). The physics-based algorithm can reconfigure (e.g., resize and/or move) the proximate cells in the cell grid, as well as add a new cell (or cells) to the cell grid in the cell layout interface, or delete one of the proximate cells to maintain the grid layout spacing of the cells in the cell grid.

Figure 7:
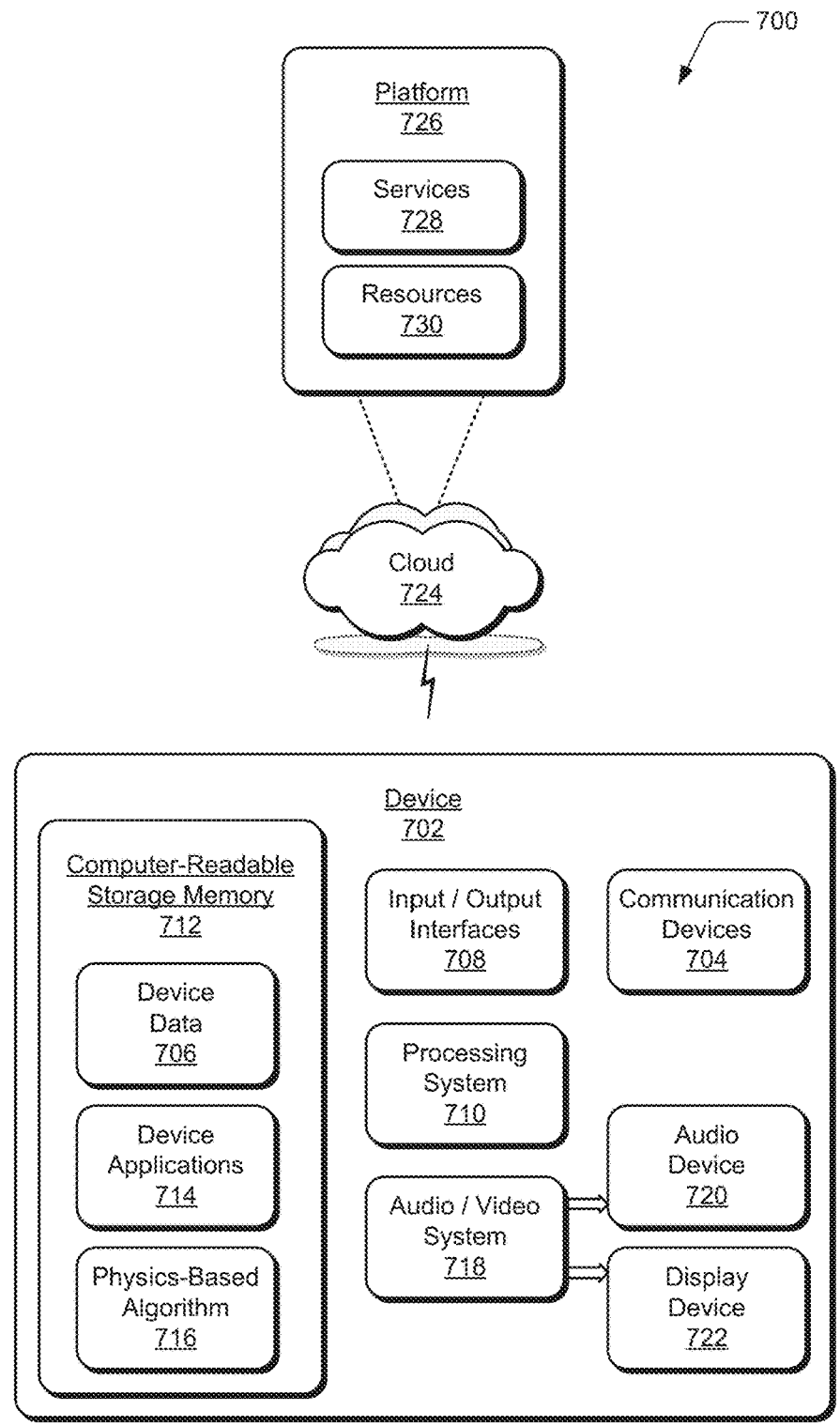
FIG. 7 illustrates an example system with an example device that can implement embodiments of physics-based cell layout redesign.

FIG. 7 illustrates an example system 700 that includes an example device 702, which can implement embodiments of physics-based cell layout redesign. The example device 702 can be implemented as any of the computing devices and/or services (e.g., server devices) described with reference to the previous FIGS. 1-6, such as any type of computing device, client device, mobile phone, tablet, communication, entertainment, gaming, media playback, and/or other type of device. For example, the tablet device 102, the computing device 502, and/or server devices of the cloud-based image service 522 may be implemented as the example device 702.

The device 702 includes communication devices 704 that enable wired and/or wireless communication of device data 706, such as cell layout interface data and computer applications content that is transferred from one computing device to another, and/or synched between multiple computing devices. The device data can include any type of audio, video, image, and/or graphic data that is generated by applications executing on the device. The communication devices 704 can also include transceivers for cellular phone communication and/or for network data communication.

The device 702 also includes input/output (I/O) interfaces 708, such as data network interfaces that provide connection and/or communication links between the device, data networks, and other devices. The I/O interfaces can be used to couple the device to any type of components, peripherals, and/or accessory devices, such as a digital camera device that may be integrated with device 702. The I/O interfaces also include data input ports via which any type of data, media content, and/or inputs can be received, such as user inputs to the device, as well as any type of audio, video, and/or image data received from any content and/or data source.

The device 702 includes a processing system 710 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 702 may further include any type of a system bus or other data and command transfer system that couples the various components within the device. A system bus can include any one or combination of different bus structures and architectures, as well as control and data lines.

The device 702 also includes computer-readable storage memory 712, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 712 provides storage of the device data 706 and various device applications 714, such as an operating system that is maintained as a software application with the computer-readable storage memory and executed by the processing system 710. In this example, the device applications also include various computer applications and a physics-based algorithm 716 that implement embodiments of physics-based cell layout redesign, such as when the example device 702 is implemented as the computing device 502 shown in FIG. 5. Examples of the physics-based algorithm 716 includes the physics-based algorithm 518 that is implemented by the computing device 502 and/or by the cloud-based image service 522, as described with reference to FIG. 5.

The device 702 also includes an audio and/or video system 718 that generates audio data for an audio device 720 and/or generates display data for a display device 722. The audio device and/or the display device include any devices that process, display, and/or otherwise render audio, video, display, and/or image data, such as the image content of a digital photo. In implementations, the audio device and/or the display device are integrated components of the example device 702. Alternatively, the audio device and/or the display device are external, peripheral components to the example device. In embodiments, at least part of the techniques described for physics-based cell layout redesign may be implemented in a distributed system, such as over a "cloud" 724 in a platform 726. The cloud 724 includes and/or is representative of the platform 726 for services 728 and/or resources 730. For example, the services 728 may include the cloud-based image service described with reference to FIG. 5.

The platform 726 abstracts underlying functionality of hardware, such as server devices (e.g., included in the services 728) and/or software resources (e.g., included as the resources 730), and connects the example device 702 with other devices, servers, etc. The resources 730 may also include applications and/or data that can be utilized while computer processing is executed on servers that are remote from the example device 702. Additionally, the services 728 and/or the resources 730 may facilitate subscriber network services, such as over the Internet, a cellular network, or Wi-Fi network. The platform 726 may also serve to abstract and scale resources to service a demand for the resources 730 that are implemented via the platform, such as in an interconnected device embodiment with functionality distributed throughout the system 700. For example, the functionality may be implemented in part at the example device 702 as well as via the platform 726 that abstracts the functionality of the cloud 724.

Although embodiments of physics-based cell layout redesign have been described in language specific to features and/or methods, the appended claims are not necessarily limited to the specific features or methods described. Rather, the specific features and methods are disclosed as example implementations of physics-based cell layout redesign, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method to redesign a cell layout of a cell grid based on physics properties by reconfiguring one or more cells that are proximate a manipulated cell in the cell grid, the method comprising:
    displaying a cell layout interface that includes the cells in the cell grid;
    receiving a redesign input to manipulate a cell in the cell layout interface;
    determining the one or more cells that are proximate the manipulated cell based on a percentage of common edge relations between an edge of the manipulated cell and respective edges of the one or more cells; and
    reconfiguring the one or more proximate cells based on the redesign input to the manipulated cell and the percentage of common edge relations between the edges of the cells, the reconfiguring further based on a percentage of force for opposing forces applied to the edges of the cells during the redesign input to the manipulated cell.

2. The method as recited in claim 1, wherein said reconfiguring the one or more proximate cells is further based on a grid layout spacing of the cells in the cell grid.

3. The method as recited in claim 1, wherein said receiving the redesign input is received to manipulate two or more cells in the cell layout interface, the method comprising:
    said determining the one or more cells that are proximate the manipulated two or more cells based on the edge relations; and
    said reconfiguring the one or more proximate cells based on the redesign input to the manipulated two or more cells and the edge relations.

4. The method as recited in claim 1, wherein the redesign input to manipulate the cell is received to at least one of resize the manipulated cell or move the manipulated cell in the cell grid.

5. The method as recited in claim 1, further comprising:
    determining the percentage of the common edge relations between the edge of the manipulated cell and the respective edges of the one or more cells; and
    resizing the one or more proximate cells based on the percentage of common edge relations between the edges of the cells, at least one of the proximate cells said resizing in a first direction and another one of the proximate cells said resizing in a different, second direction responsive to the redesign input to the manipulated cell.

6. The method as recited in claim 1, wherein said reconfiguring the one or more proximate cells based on the percentage of force for each of the opposing forces applied to the edges of the cells is further based on the percentage of common edge relations between the edge of the manipulated cell and the respective edges of the one or more cells.

7. The method as recited in claim 1, wherein said reconfiguring the one or more proximate cells includes one of:
adding a new cell to the cell grid in the cell layout interface; or
deleting one of the proximate cells to maintain a grid layout spacing of the cells in the cell grid.

8. The method as recited in claim 1, further comprising:
maintaining grid layout spacing between the one or more cells that are proximate a manipulated cell in the cell grid by filling-in void spaces between the cells that are created responsive to the redesign input to manipulate the cell in the cell layout interface.

9. A computing device implemented to redesign a cell layout of a cell grid based on physics properties by reconfiguring proximate cells to a manipulated cell in the cell grid, the computing device comprising:
a display device configured to display a cell layout interface that includes the manipulated cell and the proximate cells in the cell grid;
a memory and processor system configured to execute a physics-based algorithm as a computer application that is implemented to:
receive a redesign input to the manipulated cell in the cell layout interface;
determine the proximate cells to the manipulated cell based on a percentage of common edge
relations between an edge of the manipulated cell and respective edges of the proximate cells; and
reconfigure the one or more proximate cells based on opposing forces applied to the edges of the cells during the redesign input to the manipulated cell, a percentage of force for each of the opposing forces being applied relative to the percentage of common edge relations between the edges of the cells.

10. The computing device as recited in claim 9, wherein the physics-based algorithm is further implemented to said reconfigure the proximate cells based on grid layout spacing of the cells in the cell grid.

11. The computing device as recited in claim 9, wherein the physics-based algorithm is further implemented to:
receive the redesign input received to manipulate two or more cells in the cell layout interface;
determine the proximate cells to the manipulated two or more cells based on the edge relations; and
reconfigure the proximate cells based on the redesign input to the manipulated two or more cells and the edge relations.

12. The computing device as recited in claim 9, wherein the physics-based algorithm is implemented to receive the redesign input to the manipulated cell to at least one of resize the manipulated cell or move the manipulated cell in the cell grid.

13. The computing device as recited in claim 9, wherein the physics-based algorithm is implemented to:
determine the percentage of common edge relations between the edge of the manipulated cell and the respective edges of the proximate cells; and
further reconfigure the proximate cells based on the percentage of common edge relations between the edges of the cells.

14. The computing device as recited in claim 9, wherein the physics-based algorithm is implemented to reconfigure the proximate cells based on the opposing forces applied to the edges of the cells, further based on the percentage of common edge relations between the edge of the manipulated cell and the respective edges of the one or more cells.

15. The computing device as recited in claim 9, wherein, to reconfigure the proximate cells, the physics-based algorithm is implemented to one of:
add a new cell to the cell grid in the cell layout interface; or
delete one of the proximate cells to maintain a grid layout spacing of the cells in the cell grid.

16. The computing device as recited in claim 9, wherein the physics-based algorithm is further implemented to resize the proximate cells, at least one of the proximate cells being resized in a different direction than another one of the proximate cells responsive to the redesign input to the manipulated cell.

17. A method for physics-based cell layout redesign, the method comprising:
receiving a redesign input to manipulate a cell in a cell grid;
determining one or more cells that have an edge relation between an edge of the manipulated cell and respective edges of the one or more cells;
determining opposing forces applied to the edge of the manipulated cell and to the respective edges of the one or more cells that have the edge relation; and
reconfiguring the cell grid of the cells based on the opposing forces applied to the cell edges caused by the redesign input to the manipulated cell, a percentage of force for each of the opposing forces based on a percentage of common edge relations between the edge of the manipulated cell and the respective edges of the one or more cells.

18. The method as recited in claim 17, wherein said reconfiguring the cell grid is further based on a grid layout spacing of the cells in the cell grid.

19. The method as recited in claim 17, wherein:
the redesign input to manipulate the cell is received to at least one of resize the manipulated cell or move the manipulated cell in the cell grid; and
said reconfiguring the cell grid of the cells includes one of adding a new cell to the cell grid or deleting one of the cells to maintain a grid layout spacing of the cells in the cell grid.

20. The method as recited in claim 17, further comprising:
maintaining grid layout spacing between the one or more cells that have the edge relation to the manipulated cell in the cell grid by filling-in void spaces between the cells responsive to the redesign input to manipulate the cell in the cell grid.

* * * * *